READ OPERATION

INVENTOR
ARNOLD E. LIEPA
BY Kenneth S. Glace
ATTORNEY

INVENTOR
ARNOLD E. LIEPA
BY Kenneth S. Grace
ATTORNEY

WRITE OPERATION

INVENTOR
ARNOLD E. LIEPA
BY Kenneth S. Grace
ATTORNEY

United States Patent Office 3,533,083

Patented Oct. 6, 1970

3,533,083

DUMMY WIRE SELECTION SCHEME FOR DATA PROCESSING EQUIPMENT MEMORY SYSTEMS

Arnold E. Liepa, St. Paul, Minn., assignor to Sperry Rand Corporation, New York, N.Y., a corporation of Delaware Filed Jan. 30, 1968, Ser. No. 701,591
Int. Cl. G11c 5/00
U.S. Cl. 340—172.5 5 Claims

ABSTRACT OF THE DISCLOSURE

A dummy wire selector for data processing equipment memory systems, which systems are comprised of at least two sections, each section having a plurality of active wires and an associated dummy wire for memory noise cancellation. The dummy wire selector, for the write cycle, selects the dummy wire that is associated with the memory section not including the addressed active wire. The dummy wire selector, for the read cycle, selects the same dummy wire that was selected in the previous memory cycle if the same active wire is selected, but selects a different dummy wire than was selected in the previous memory cycle if a different active wire is selected. The object is to always select a dummy wire that is in the proximate noise condition as is the selected active wire.

BACKGROUND OF THE INVENTION

The present invention relates to the electronic data processing field and in its preferred embodiment to an electrically alterable memory system for using electrical conductors plated with a thin-ferromagnetic-film layer as the memory elements. Such memory systems are well-known for their principle advantage lying in their adaptability to mass, or batch, fabrication techniques which provide high volumetric efficiency, i.e., many binary digits, or bits, per cubic inch, and the resulting economy. An excellent background for such memory systems appears in the publication "A 500 Nanosecond Main Computer Memory Utilizing Plated-Wire Elements," AFIPS, Conference Proceedings, volume 29, 1966, FJCC, pages 305–314.

Plated-wire memory systems utilizing the magnetization of areas along a conductive wire that is plated by a thin-ferromagnetic-film layer may be operated in the well-known word-organized or bit-organized memory systems. The high volumetric efficiency achieved by such memory systems must necessarily bring the several areas of magnetization, each representing discrete bits of digital data, and their associated circuitry into closer proximity whereby there arises "noise" signals that are similar to those obtained in more conventional toroidal ferrite core arrays. With the plated-wire digit wires or lines, which are normally established in a parallel, planar array, enveloped by a plurality of word wires orthogonal thereto, there is provided the normal capacitive and inductive coupling between adjacent digit wires and word wires whereby memory selection currents may induce noise signals in the selected digit wires that are of such a magnitude as to substantially block out the digital significance of the readout signal. An excellent background for such noise signal conditions appears in the publication "Crosstalk and Reflections In High Speed Digital Systems," AFIPS, Conference Proceedings, volume 27, Part 1, 1965, FJCC, pages 511–525. Accordingly, several prior art techniques for the elimination of such deleterious noise signals have been incorporated in plated-wire memory systems.

One prior art technique often utilized to eliminate, or reduce, deleterious noise signals is the utilization of a "dummy" wire or line. In toroidal ferrite core arrays such dummy lines generally consist of a conductor running parallel to and associated with a particular output or sense line such that the dummy line and the output line are effected by substantially the same noise signals whereby there is induced in such lines similar common mode noise signals. The dummy line and the active output line are in turn coupled to a differential sense amplifier which cancels out the common mode noise signal leaving only the desired readout signal as an output therefrom. In plated-wire memory systems the dummy wire usually consists of a digit wire, similar to that of the other plated-wire active wires of the plated-wire array, which is coupled in parallel to suitable gating means with a plurality of digit wires. The dummy wire and the associated plurality of active digit wires are maintained in a substantially close-packed relationship whereby it is expected that the common mode noise signals, which are induced in the dummy wire, are equal to those that are induced in each of the associated active digit wires whereby the associated differential amplifier provides a signal substantially representative of the expected readout signal.

As the noise or common mode signals are generally due to radiated coupling, denoted as capacitive and inductive coupling, large loop areas established by substantially widely separated dummy wire, digit wire pairs can contribute undesirably large noise signals of different intensities whereby the differential sense amplifier is unable to eliminate all the deleterious noise. It would be desirable if each digit wire had its own associated dummy wire whereby the physical relationship therebetween would be constant throughout the entire two-dimensional plated-wire memory array. However, it is obvious that this expedient would halve the volumetric efficiency, and, accordingly, double the cost-per-bit of such memory system.

In the copending patent application of C. A. Nelson, Ser. No. 508,695, filed Nov. 19, 1965, now Pat. No. 3,465,312, there is disclosed a plated-wire memory system which is comprised of two sections, each section having a plurality of active wires and an associated dummy wire for memory noise cancellation. This copending patent application provides an active wire, dummy wire selection system whereby for a read cycle the selected dummy wire is that dummy wire that is in the section of the memory system not including the selected active wire. This arrangement provides the coupling of both selected and unselected noise signals to the differential amplifier whereby there is provided an improved signal-to-noise ratio over that permitted by prior art systems.

Some of the most efficient memory array packaging schemes, such as disclosed in the copending patent application of L. J. Michaud et al., Ser. No. 644,861, filed June 9, 1967, assigned to the Sperry Rand Corporation as is the present invention, provide for the compact arrangement of plated-wire memory arrays; a plurality of active wires and dummy wires are arranged in parallel planar tunnels insulatively sandwiched between an enveloping ground plane for electromagnetic shielding. The active wires and the dummy wires are, at one end, coupled to ground spatially along a ground plane that may be electrically continuous with the enveloping ground plane. In such a system the write cycle includes the coupling of a write current to one active wire and to a related dummy wire whereby the write current is absorbed by the ground plane functioning as a current sink. However, testing of such arrangements indicates that such write currents generate eddy currents in the area of the ground plane that is proximate the wire that couples the current to the ground plane. As a result, the current carrying wire, i.e., the selected active wire and dummy wire do not "recover" from the write current, i.e., the write current induced signals do not decay to a negligible intensity, for periods of well over one microsecond (μs). As such memory system cycle times are under one microsecond and as such systems utilize differential amplifiers to cancel out noise signals, it is essential that the selected active wire and dummy wire are operating at approximately the same recovery state whereby the decaying noise signals therein are of the same intensity. Accordingly, it is desirable that there be provided a system whereby the selected active wire and dummy wire are of the same recovery state optimizing the noise cancelling features of the associated differential sense amplifier.

SUMMARY OF THE INVENTION

The present invention is directed toward a dummy wire selector that is incorporated in a data processing equipment memory system. Such memory system is preferably comprised of at least two sections, each section having a plurality of active wires and an associated dummy wire for memory noise cancellation. The memory system of the present invention includes a present address register (PAR), a prior address register (PER), and a comparator (CPR). The present address in the form of a multibit word, or character, is entered into the present address register and is compared, by the comparator, to the prior address held in the prior address register. The output of the comparator (if PAR=PER there is no output therefrom, if PAR≠PER there is an output therefrom) through timing signals and read enable and write enable signals effects a dummy wire elector (DWS) which enables, or gates, the proper dummy wire.

During a wire cycle, the most significant bit, i.e., the highest ordered bit of the present address word as held in the present address register always selects the dummy wire that is associated with the memory section of the memory system that is not associated with the selected active wire. Thus, during a write cycle the selected active wire of one section of the memory system is coupled to a first input terminal of the parallel coupled bit-driver, differential amplifier while the dummy wire of that section of the memory system not associated with the selected active wire is coupled to the second input terminal of the parallel coupled bit-driver, differential amplifier. During the read cycle, if the present address is different than the prior address, the comparator emits a ≠ signal that is coupled to the dummy wire elector which selects the dummy wire not selected by the prior address. In contrast, if the present address is equal to the prior address the comparator emits no output signal whereby the dummy wire elector is not toggled thereby selecting the same dummy wire as was selected by the prior address. Thus, as with the write cycle, the selected active wire and the selected dummy wire, both of the same recovery state, are coupled to their respectively associated terminals of the associated parallel coupled bit-driver, differential amplifier whereby the noise cancelling features of the associated differential sense amplifier are optimized providing a maximized signal-to-noise ratio output of the differential sense amplifier.

DESCRIPTION OF THE PREFERRED EMBODIMENT

Figure 1:
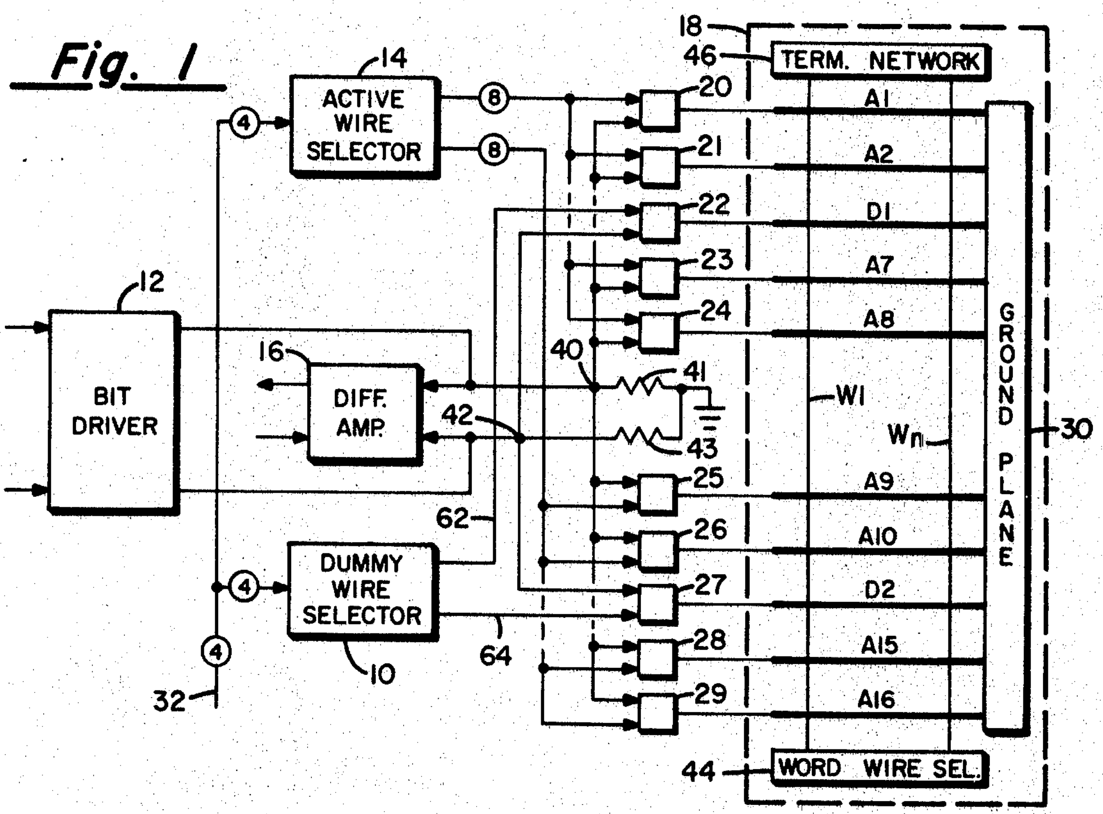
FIG. 1 is an illustration of a block diagram of a memory system incorporating the present invention.

With particular reference to FIG. 1 there is presented an illustration of a block diagram of a memory system incorporating the present invention. As stated above the present invention is considered to be an improvement type invention of that disclosed in the copending patent application of C. A. Nelson. Accordingly, the inventive concept of the present invention is considered to be embodied within the dummy wire selector 10, it being understood that the other portions thereof, such as bit-driver 12, active wire selector 14 and differential amplifier 16 may be of any of many well-known configurations. Memory array 18 includes 16 active wires and 2 dummy wires: active wires A1–A16 divided into two equal sections; a first memory section including 8 active wires A1–A8 and their associated dummy wire D1 and a second memory section including 8 active wires A9–A16 and their associated dummy wire D2. The fabrication of such plated-wire memory array may be by any well-known means including that of the above described copending patent application of L. J. Michaud et al. The selection of any active wire A1–A16 and any dummy wire D1, D2 is accomplished by a single-ended selection technique through wire switches 20–29. With active wires A1–A16 and dummy wires D1, D2 coupled at one end to a ground plane 30, the selection of the appropriate wire switch 20–29 selects the associated active wire or dummy wire.

Operation of the memory system of FIG. 1 is initiated by the multibit word, four bits in the illustrated example, which is representative of the address of the desired active wire A1–A16, being coupled to dummy wire selector 10 and active wire selector 14 at terminal 32. Active wire selector 14 translates the four-bit present address word selecting one of the 16 gating lines that couple active wire selector 14 to wire switches 20, 21, 23, 24, 25, 26, 28, 29. Concurrently, dummy wire selector 10 selects one of the two gating lines coupling dummy wire selector 10 to wires switches 22, 27. This selection process, by dummy wire selector 10 and active wire selector 14, couples the addressed active wire and the desired dummy wire to nodes 40 and 42, respectively; nodes 40, 42 are coupled in common to respective sides of parallel coupled bi-directional bit-driver 12 and differential amplifier 16 and associated terminating resistors 41, 43, respectively. As in the above noted copending patent application of C. A. Nelson, the differential amplifier 16 or bit-driver 12 are alternatively coupled to such nodes 40, 42 for the read and write operations, respectively. Additionally, as is well-known, word wire selector 44 for the read and write operations couple the appropriate current signals to the *n* word wires W1, W*n* that are terminated in terminating network 46.

As stated above, in some of the most efficient memory packaging schemes providing for the compact arrangement of plated-wire memory arrays, such as array 18, the plurality of active wires A1–A16 and dummy wires D1, D2 are arranged in parallel, planar tunnels insulatively sandwiched between an enveloping ground plane for electromagnetic shielding. The active wires A1–A16 and the dummy wires D1, D2 are, at one end, coupled to ground along a ground plane 30 that may be electrically continuous with the enveloping ground plane. In such a system the write cycle includes coupling a write current to one active wire and to a related dummy wire whereby the write current is absorbed by the current sink functioning ground plane 30. It is to be appreciated that a concurrent selection of word wires W1–W*n* by word wire selector 44 is required; however, such selection plays no part in the present invention. Such write currents generate eddy currents in the area of the ground plane 30 that is proximate the active wire and the dummy wire that couple the write current to the ground plane 30. As a result, the current carrying wires, i.e., the selected active wire A1–A16 and dummy wire D1, D2, do not "recover" from the write current, i.e., the write current induces signals that do not decay to a negligible magnitude, for periods exceeding that of the memory system cycle time. As such memory systems utilize differential amplifiers to cancel out noise signals it is essential that the selected active wire and dummy wire are operating at approximately the same recovery state whereby the decaying noise signals therein are of the same intensity. Accordingly, the present invention provides the dummy wire selector 10 in the otherwise well-known memory system configuration of FIG. 1 whereby the selected active wire and dummy wire are of the same recovery state optimizing the noise cancelling features of the associated differential amplifier 16.

Figure 2:
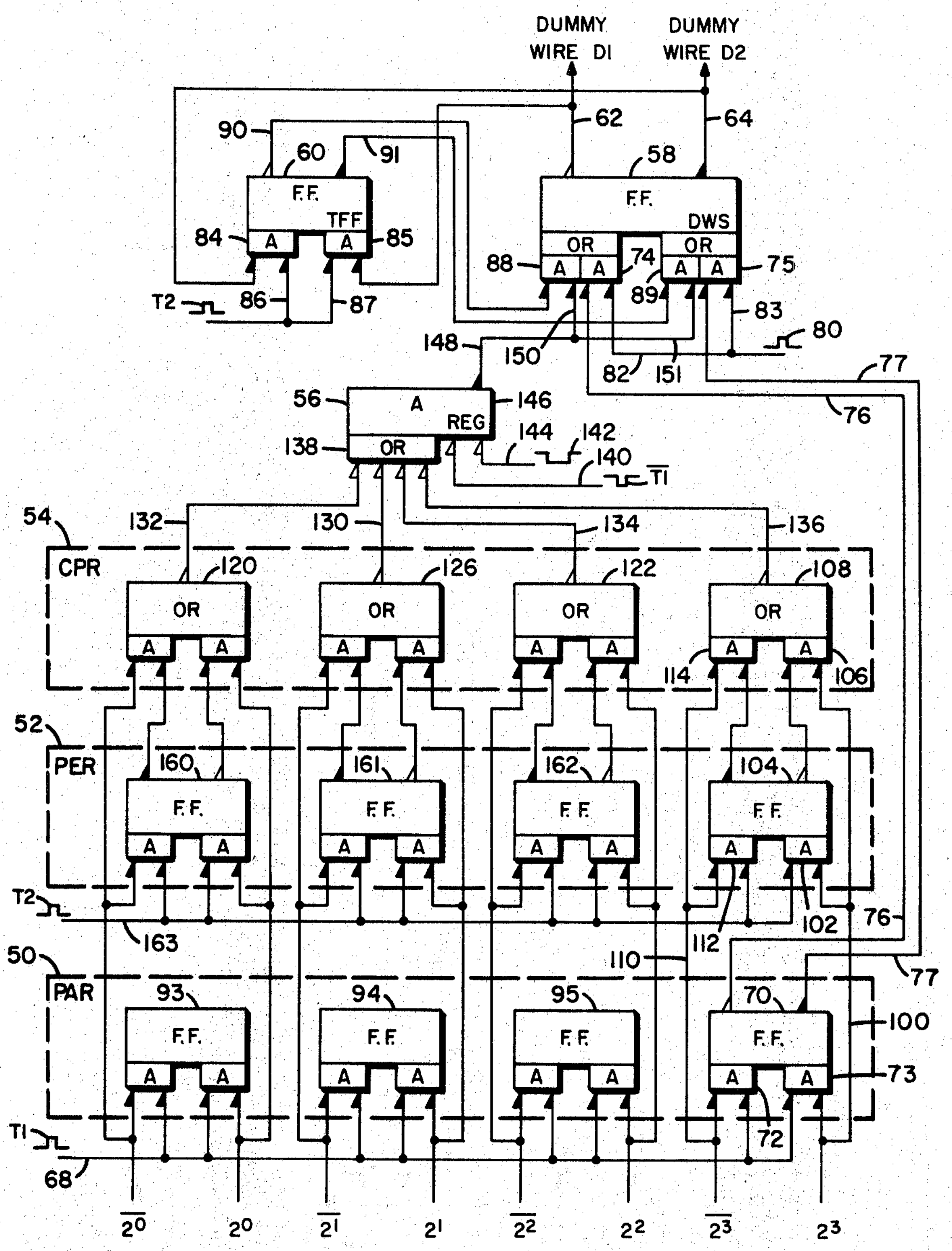
FIG. 2 is an illustration of a block diagram of the dummy wire selector of the present invention.
Figure 3A:
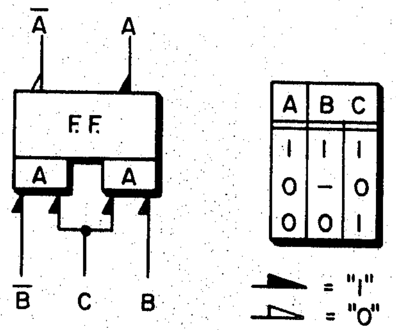
FIGS. 3*a*–3*d* are the logic elements and their truth tables of the illustrated embodiment of FIG. 2.
Figure 3B:
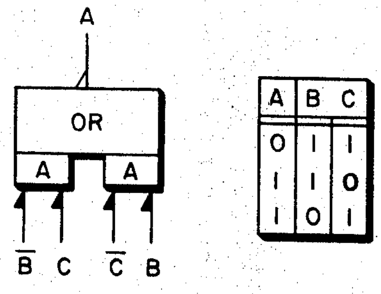
Figure 3C:
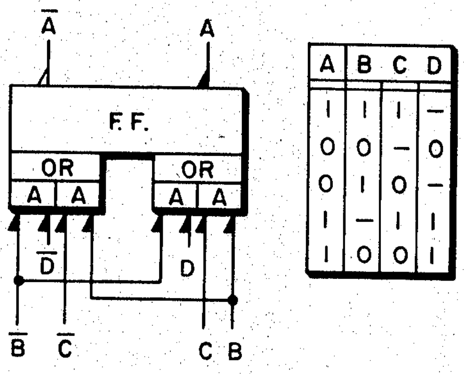
Figure 3D:
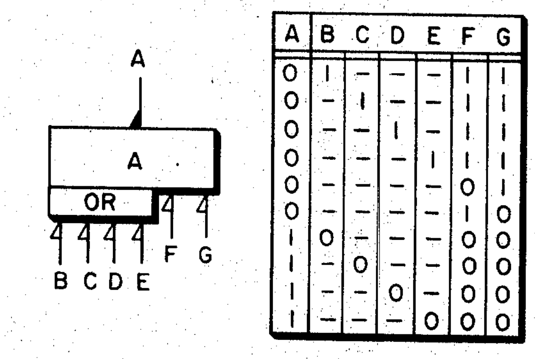

With particular reference to FIG. 2 there is presented an illustration of a block diagram of a dummy wire selector 10 that may be utilized in the memory system of FIG. 1. Dummy wire selector 10 includes a present address register 50, a prior address register 52, a comparator 54, a read enable gate 56, a dummy wire elector 58 and a toggle flip-flop 60. The present address, in the form of a four-bit multibit word, or character, is entered, in parallel, into the present address register 50. This present address register 50 may be a part of the associated central processor. The prior address held in the prior address register 52 is compared to the present address held in present address register 50 by comparator 54. If the present address is not the same as the prior address, the comparator couples at least one enabling signal to the read enable gate 56. If the selected operation is a read operation, read enable gate 56 is enabled causing it, in turn, to couple a read enable signal to the dummy wire elector 58. Dummy wire elector 58 and toggle flip-flop 60 are cross-coupled so that dummy wire elector 58 is toggled whereby the dummy wire select lines 62, 64 are logically reversed, i.e., if line 62 had previously been at the select voltage level of ground and line 64 had been at the nonselect voltage level of +3 volts then line 62 is set to +3 volts ground and line 64 is set to the ground level. Thus, for a read operation with the present address not being the same as the prior address the dummy wire selector 10 selects the dummy wire not utilized for the prior address selection. Correspondingly, it is apparent that if the present address had been the same as the prior address, dummy wire elector 58 would not have been toggled whereby the dummy wire selector 10 would have selected the same dummy wire as had been selected by the prior address.

The most significant bit of the present address register 50, the true and the complement bit $2^3$, $\overline{2^3}$ of the illustrated embodiment, is combined with the write enable signal at dummy wire elector 58 to always select dummy wire D1 when writing in active wires A9–A16 and to always select dummy wire D2 when writing in active wires A1–A8. Thus, when writing in one of the two memory sections making up memory array 18 of FIG. 1 the dummy wire selector 10 always selects the dummy wire in the other section of the memory array that does not include the selected active wire. Thus, the dummy wire selector 10 of the present invention in the memory system of FIG. 1, wherein there is included a memory array 18 comprised of two memory sections each section having a plurality of active wires and an associated dummy wire, functions as follows. The dummy wire selector 10, for the write operation, or cycle, selects the dummy wire that is associated with the memory section not including the addressed active wire while the dummy wire selector 10, for the read cycle, selects the same dummy wire as selected in the previous memory cycle if the same active wire is selected, but selects a different dummy wire than was selected in the previous write cycle if a different active wire is selected. The object is to always select a dummy wire that is in the approximate noise condition as the selected active wire thus optimizing memory noise cancellation at the differential amplifier.

With particular reference to FIGS. 3*a* through 3*d* there are illustrated the logic circuit types that are utilized in the description of the illustrated embodiment of the present invention and their associated truth tables. These circuits are well-known, are commercially available, and, accordingly, shall not be described in detail since this would not add to an understanding of the present invention. It is, of course, understood that other types of logic configurations could be utilized in implementing the present invention; those shown herein have been found to be advantageous both with regard to cost and operation. In a description of the operation of the illustrated embodiment certain logic configurations shall be assumed. In this regard, a closed arrow shall be equivalent to a +3 volt signal which shall be equivalent to a logical "1" and representative of a positive signal while an open arrow shall be equivalent to a ground signal which shall be equivalent to a logical "0" and representative of a negative signal.

Figure 4:
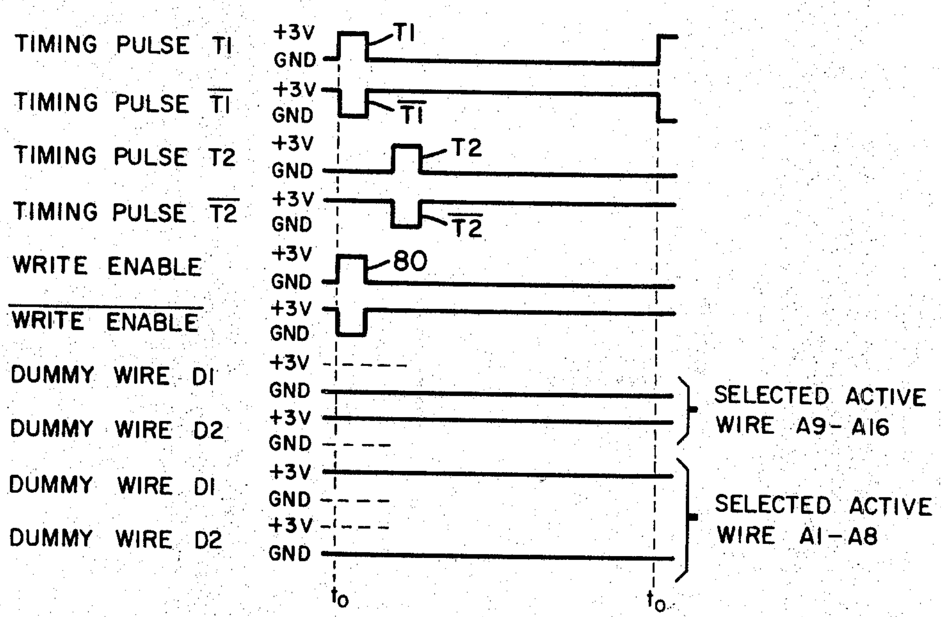
FIG. 4 is an illustration of a timing diagram for a typical write cycle of the memory system of FIG. 1.

With particular reference to FIG. 4 there is illustrated a timing diagram of the signals associated with a write operation of the illustrated embodiment of FIG. 2. In subsequent discussions with respect to the selection of wire switches 20–29 as concurrently enabled by dummy wire selector 10 and active wire selector 14 it shall be assumed that a ground signal, equivalent to a logical "0," shall enable the associated wire switch while a +3 volt signal, equivalent to a logical "1" shall disable the associated wire switch. Therefore, for any selection period only one wire switch 20, 21, 23, 24, 25, 26, 28, 29, each coupled to a respectively associated active wire A1, A2, A7, A8, A9, A10, A15, A16, shall have a ground signal, equivalent to a "0," coupled thereto selecting only one of such active lines while concurrently only one of said wire switches 22, 27, each associated with its respective dummy wire D1, D2, shall have a ground signal, equivalent to a logical "0," coupled thereto. All other wire switches, i.e., the nonselected wire switches, shall be disabled by the coupling of a +3 volt signal, equivalent to a logical "1," thereto.

For a write operation, as is to be discussed with particular reference to FIGS. 2 and 4, it is to be remembered that the dummy wire selector 10 selects the dummy wire that is associated with the memory section not including the addressed active wire. Accordingly, the highest ordered bit of the present address word that is coupled to the present address register 50 always selects the dummy wire that is associated with the memory section that is not associated with the selected active wire. With the true and the complement of the highest ordered bit $2^3$, $\overline{2^3}$ coupled to AND gates 73, 72 of stage 70 of present address register 50 being a "1," "0" timing pulse T1 on line 68 enables the associated AND gates 73, 72 enabling stage 70 to couple bit $2^3$, $\overline{2^3}$ to the respectively associated AND gates 75, 74 of dummy wire elector 58 by means of the respectively associated lines 77, 76. Concurrently, write enable signal 80 is coupled to AND gates 74, 75 by means of lines 82, 83, respectively, whereby AND gate 75 is enabled causing dummy wire elector 58 to emit a "1" on line 64 and a "0" on line 62 signifying the selection of dummy wire D1 by the enabling of wire switch 22 by the coupling of a "0" thereto. Thus, it can be seen that any time the highest ordered bit of the four-bit present address word is a "1," dummy wire elector 58 selects dummy wire D1. In contrast, with the highest ordered bit of the present address word being a "0" it is apparent that AND gate 74 would be enabled whereby dummy wire elector 58 would be caused to emit a "0" on line 64 and a "1" on line 62 indicating the selection of dummy wire D2.

Next, timing pulse T2 is coupled to AND gates 84, 85 of toggle FF60 by means of lines 86, 87, respectively. With AND gate 84 concurrently receiving a "1" from lines 86 and 64, toggle FF60 is forced to couple a "1" to AND gate 88 of dummy wire elector 58 by way of line 90 and a "0" to AND gate 89 of dummy wire elector 58 by way of line 91. With these logical signals being emitted from toggle FF60 it can be seen that if the next successive memory operation is a write operation with the highest ordered bit of the next present address word being a "1," as in the previous example, dummy wire elector 58 would again couple a "0" to line 62 and a "1" to line 64 selecting dummy wire D1. However, if the highest ordered bit is a "0," stage 70, at timing pulse T1, would reverse its state whereby a "1" and a "0" would be coupled to AND gates 74 and 75 of dummy wire elector 58 by way of lines 76 and 77, respectively. Thus, in this condition AND gate 74, upon the coupling of write enable pulse 80 to AND gates 74, 75 by way of lines 82, 83, would be concurrently receiving a "1" from both lines 76 and 82 whereupon dummy wire elector 58 would be caused to change its state emitting a "1" on line 62 and a "0" on line 64 indicating the selection of dummy wire D2. Thus, toggle FF60 is forced by timing pulse T2 to be toggled so as to reverse its state upon the reversal of the significance of the highest ordered bit $2^3$, $\overline{2^3}$ of the present address word held in stage 70 of present address register 50. Additionally, timing pulse T2 is coupled to stages 160, 161, 162 and 104 of prior address register 52 by means of line 163 whereupon the contents of present address register 50 are entered therein.

Figure 5:
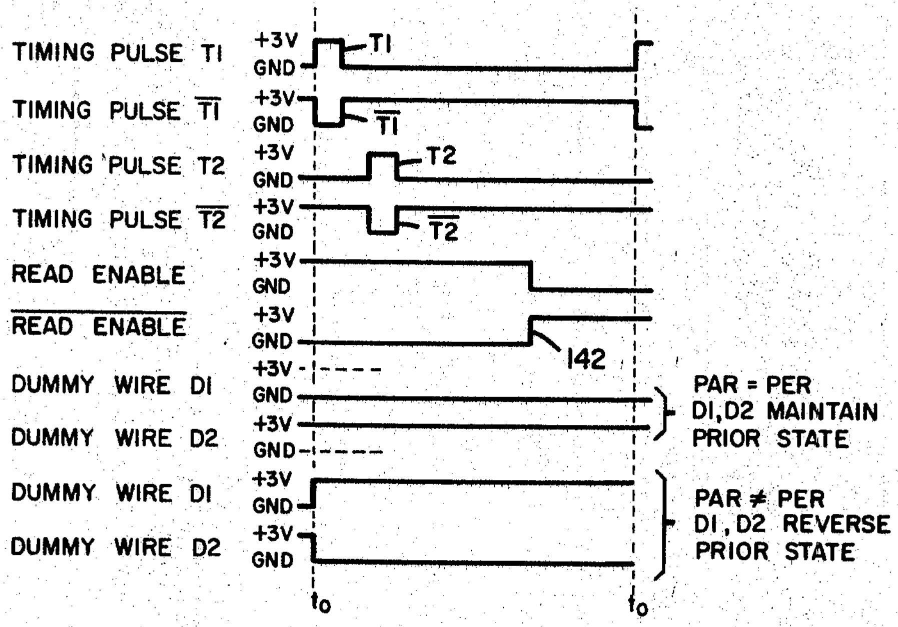
FIG. 5 is an illustration of a timing diagram for a typical read cycle of the memory system of FIG. 1.

With particular reference to FIG. 5, there is presented an illustration of a timing diagram of the signals associated with a read operation of the illustrated embodiment of FIG. 2. For this discussion of a read operation, assume that the present address register 50 and the prior address register 52 both contain the address word 1011 of the form $2^0$, $2^1$, $2^2$, $2^3$, where $2^3$ is the highest ordered bit and $2^0$ is the lowest ordered bit of the address word. Further, assume that the present address word that is to be inserted in present address register 50 at timing pulse T1 of the to be discussed read operation is the present address word 1111. Assuming that the prior memory operation had been a write operation with the address word 1011 in the present address register 50, the dummy wire elector 58 is emitting a "0" on line 62 selecting dummy wire D1 as discussed above.

At the beginning of the read operation, timing pulse T1 is coupled to line 68 which couples timing pulse T1, in parallel, to all of the AND gates of the register stages 93, 94, 95, 70 of present address register 50. Additionally, the true and the complement of the bits of the present address word, e.g., the highest ordered bits $2^3$, $\overline{2^3}$ are coupled in parallel to the associated AND gates of the like-ordered stages of the present address register 50, the prior address register 52 and the comparator 54. As an example, the true of the highest ordered bit $2^3$ is coupled in parallel by means of line 100 to AND gate 73 of stage 70 of present address register 50, to AND gate 102 of stage 104 of prior address register 52 and to AND gate 106 of stage 108 of comparator 54. In a like manner, the complement of the highest ordered bit $\overline{2^3}$ of the present address word is coupled in parallel by means of line 110 to AND gate 72 of stage 70 of present address register 50 to AND gate 112 of stage 104 of prior address register 52 and to AND gate 114 of stage 108 of comparator 54.

With the outputs of the like-ordered stages of present address register 50 and prior address register 52 coupled in parallel to their respectively associated AND gates of comparator 54, the comparator, at time $t_0$, compares the contents of the prior address register 52 to the contents of the present address register 50 emitting output signals therefrom that are indicative of the comparison so made. Accordingly, with the prior address register 52 holding the prior address 1011 and the present address register 50 holding the present address word 1111, it is apparent that stages 120, 122, 108 make an equal comparison while stage 126 makes a not equal comparison. Accordingly, stage 126 couples a "0" to its output line 130 while stages 120, 122, 108 couple a "1" to their respective output lines 132, 134, 136. Accordingly, OR gate 138 of read enable gate 56 has a "0" coupled thereto by line 130 while lines 132, 134, 136 each couple a "1" thereto. With timing pulse $\overline{\text{T1}}$ coupled to line 140 and with $\overline{\text{read enable}}$ signal 142 coupled to line 144, AND gate 146 of read enable gate 56 is concurrently receiving 3 logical "0's" and, accordingly, it is caused to couple a "1" to its output line 148. Line 148, in turn, couples the "1" to AND gates 88, 89 of dummy wire elector 58 by way of lines 150, 151, respectively. With toggle FF60 from the previous write operation as described above emitting a "1" on line 90 and a "0" on line 91, AND gate 88 of dummy wire elector 58 is enabled while AND gate 89 is disabled whereupon dummy wire elector 58 is caused to couple a "1" on its output line 62 and a "0" on its output line 64 indicating the selection of dummy wire D2 through wire switch 27.

Concurrently with the selection of the dummy wire D2 for a read operation as described above, active wire selector 14 at timing pulse T1 translates the present address word 1111 coupling a logical "0" to line switch 29 indicating the selection of active wire A16. Thus, with a prior write operation in prior address 1011, i.e., active wire A14, the next read operation of present address 1111, i.e., active wire A16, has selected dummy wire D2 which is in the same memory section as the selected active wire; see Table A.

TABLE A.—ADDRESS WORD TRANSLATION

| Binary | | | | | |
|---|---|---|---|---|---|
| $2^0$ | $2^1$ | $2^2$ | $2^3$ | Octal | Decimal |
| 0 | 0 | 0 | 0 | 0 | A1 |
| 1 | 0 | 0 | 0 | 1 | A2 |
| 0 | 1 | 0 | 0 | 2 | A3 |
| 1 | 1 | 0 | 0 | 3 | A4 |
| 0 | 0 | 1 | 0 | 4 | A5 |
| 1 | 0 | 1 | 0 | 5 | A6 |
| 0 | 1 | 1 | 0 | 6 | A7 |
| 1 | 1 | 1 | 0 | 7 | A8 |
| 0 | 0 | 0 | 1 | 10 | A9 |
| 1 | 0 | 0 | 1 | 11 | A10 |
| 0 | 1 | 0 | 1 | 12 | A11 |
| 1 | 1 | 0 | 1 | 13 | A12 |
| 0 | 0 | 1 | 1 | 14 | A13 |
| 1 | 0 | 1 | 1 | 15 | A14 |
| 0 | 1 | 1 | 1 | 16 | A15 |
| 1 | 1 | 1 | 1 | 17 | A16 |

Next, timing pulse T2 is coupled to AND gates 84, 85 of toggle FF60 by means of lines 86, 87, respectively. With AND gate 85 concurrently receiving a "1" from lines 87 and 62, toggle FF60 is forced to couple a "1" to AND gate 89 of dummy wire elector 58 by way of line 91 and a "0" to AND gate 88 of dummy wire elector 58 by way of line 90. Concurrently, timing pulse T2 is coupled to stages 160, 161, 162 and 104 of prior address register 52 by means of line 163 whereupon the contents of present address register 50 are entered into prior address register 52 in preparation for the next memory cycle.

As a further example of the operation of dummy wire selector 10 of FIG. 1 assume that the next memory operation is another read operation in present address 0110, i.e., active wire A7. With the previous read operation having been in the other memory section of memory array 18, dummy wire selector 10 should select dummy wire D1 which was the dummy wire not selected in the previous read operation of active wire A16. As in the previous discussion the true and the complement of the bits of the present address word 0110 are coupled in parallel to the correspondingly ordered stages of present address register 50, prior address register 52 (holding the prior address word 1111) and comparator 54. At timing pulse T1, comparator 54 makes a comparison between the prior address word 1111 and the present address word 0110. Accordingly, stages 120, 108 of comparator 54 couple a "0" to their associated output lines 132, 136, respectively, and thence to OR gate 138 of read enable gate 56. Further, stages 126, 122 of comparator 54 couple a "1" to their output lines 130, 134, respectively, and thence to OR gate 138 of read enable gate 56. With timing pulse $\overline{T1}$ and $\overline{\text{read enable}}$ pulse 142 being concurrently coupled to their associated lines 140, 144, respectively, read enable gate 56 is enabled causing it to couple a "1" to its output line 148 and thence to AND gates 88, 89 of dummy wire elector 58.

With toggle FF60 from its previous read operation coupling a "1" to its output line 91 and thence to AND gate 89 of dummy wire elector 58 AND gate 89 is enabled causing dummy wire elector 58 to couple a "1" to its output line 64 and a "0" to its output line 62 indicating the selection of dummy wire D1. Concurrently, at timing pulse T1, active wire selector 14 has selected active wire A7 whereupon there has been selected for this read operation a dummy wire that was not selected in the previous read operation.

If a write operation is now to be performed in the same address as was previously read out, i.e., in present address word 0110, the write operation is as discussed with respect to FIG. 4. At timing pulse T1, the true and the complement of the highest ordered bit $2^3$, $\overline{2^3}$ of the present address word causes to emit from stage 70 of present address register 50 to a "1" on line 76 and a "0" on line 77. Lines 76, 77, in turn, couple a "1" to AND gate 74 and "0" to AND gate 75 of dummy wire elector 58. The write enable signal 80, at timing pulse T1, being coupled to AND gate 74 and AND gate 75 by way of lines 82 and 83, respectively, enables AND gate 74 causing dummy wire elector 58 to couple a "1" to its output line 62 and a "0" to its output line 64 indicating the selection of dummy wire D2. Concurrently, at timing pulse T1, active wire selector 14 has translated the present address word 0110 coupling a "0" to one of its 16 output lines selecting active wire A7. As before, at time T2 toggle FF60 is effected by timing pulse T2 at its AND gates 84, 85 which with the present output of "1" on line 62 and "0" on line 64 permits toggle FF60 to remain in its previous state.

Thus, it is apparent that there has been described and illustrated herein a preferred embodiment of the present invention that provides a novel dummy wire selection scheme for data processing equipment memory systems. It is understood that suitable modifications may be made in the structure as disclosed provided that such modifications come within the spirit and scope of the appended claims. Having now fully illustrated and described my invention, what I claim to be new and desire to protect by Letters Patent is set forth in the appended claims.

1. A memory system, comprising:
a memory array comprised of at least two sections, each section including a plurality of active wires and a dummy wire, each of said active wires defined by an associated unique memory address word;
an active wire selector for selecting only one of said active wires as defined by a present address word;
a dummy wire selector for selecting one of said dummy wires, said dummy wire selector including;
means for comparing said present address word to a prior address word;
means enabling said comparing means to compare said present address word to said prior address word for selecting, during a read operation, the dummy wire that had been selected for said prior address word if said present address word and said prior address word are the same and for selecting, during a read operation, a dummy wire that had not been selected for said prior address word if said present address word and said prior address word are different.

2. The memory system of claim 1 further including means coupled to the highest ordered bit of said present address word for selecting, during a write operation, a dummy wire that is not associated with the memory section that includes the selected active wire.

3. A memory system, comprising:
a memory array comprised of at least two sections, each section including a plurality of active wires and a dummy wire, each of said active wires defined by an associated unique memory address word;
an active wire selector for selecting only one of said active wires as defined by a present address word;
a dummy wire selector for selecting only one of said dummy wires;
a present address register for holding a present address word defining one of said active wires;
means for coupling said present address register to said active wire selector and to said dummy wire selector;
said dummy wire selector including;
a prior address register for holding a prior address word defining one of said active wires;
a comparator for comparing said present address word to said prior address word;
a dummy wire elector for selecting only one of said dummy wires;
read enable means for coupling said comparator to said dummy wire elector;
means coupling the highest ordered bit of said present address register to said dummy wire elector for selecting, during a write operation, a dummy wire that is not associated with the memory section that includes the selected active wire;
means enabling said read enable means to couple said comparator to said dummy wire elector for selecting, during a read operation, the dummy wire selected for said prior address word if said present address word and said prior address word are the same, and for selecting, during a read operation, a dummy wire not selected for said prior address word if said present address word and said prior address word are different.

4. A memory system, comprising:
a memory array comprised of at least two sections, each section including a pluraliy of active wires and a dummy wire, each of said active wires defined by an associated unique memory address word;
an active wire selector for selecting only one of said active wires as defined by a present address word;
a dummy wire selector for selecting only one of said dummy wires, said dummy wire selector including;
a present address register for holding a present address word defining one of said active wires;
a prior address register for holding a prior address word defining one of said active wires;
a comparator for comparing said present address word to said prior address word;
a dummy wire elector for selecting only one of said dummy wires;
read enable means for coupling said comparator to said dummy wire elector;
means coupling the highest ordered bit of said present address register to said dummy wire elector for selecting, during a write operation, a dummy wire that is not associated with the memory section that includes the selected active wire;
means enabling said read enable means to couple said comparator to said dummy wire elector for selecting, during a read operation, the dummy wire selected for said prior address word if said present address word and said prior address word are the same, and for selecting, during a read operation, a dummy wire not selected for said prior address word if said present address word and said prior address word are different.

5. A memory system, comprising:
a memory array comprised of at least two sections, each section including a plurality of active wires and a dummy wire, each of said active wires defined by an associated unique memory address word;

an active wire selector for selecting only one of said active wires as defined by a present address word;

a dummy wire selector for selecting only one of said dummy wires, said dummy wire selector including;

a comparator for comparing a present address word to a prior address word;

a dummy wire elector for selecting only one of said dummy wires;

read enable means for coupling said comparator to said dummy wire elector;

means coupling the highest ordered bit of said present address word to said dummy wire elector for selecting, during a write operation, a dummy wire that is not associated with the memory section that includes the selected active wire;

means enabling said read enable means to couple said comparator to said dummy wire elector for selecting, during a read operation, the dummy wire selected for said prior address word if said present address word and said prior address word are the same, and for selecting, during a read operation, a dummy wire not selected for said prior address word if said present address word and said prior address word are different.

References Cited

UNITED STATES PATENTS 3,465,312 9/1969 Nelson ------------ 340—174

PAUL J. HENON, Primary Examiner

M. B. CHAPNICK, Assistant Examiner

U.S. Cl. X.R.

340—174